(12) United States Patent
Park et al.

(10) Patent No.: US 10,317,937 B2
(45) Date of Patent: Jun. 11, 2019

(54) COMPUTING DEVICE WITH A ROTATABLE DISPLAY HOUSING

(71) Applicant: HEWLETT-PACKARD DEVELOPMENT COMPANY, L.P., Houston, TX (US)

(72) Inventors: Chan Park, Houston, TX (US); Wen-Yo Lu, Houston, TX (US); Hao Ming Chen, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/306,562

(22) PCT Filed: May 28, 2014

(86) PCT No.: PCT/US2014/039866
§ 371 (c)(1),
(2) Date: Oct. 25, 2016

(87) PCT Pub. No.: WO2015/183267
PCT Pub. Date: Dec. 3, 2015

(65) Prior Publication Data
US 2017/0075383 A1 Mar. 16, 2017

(51) Int. Cl.
*G06F 1/16* (2006.01)

(52) U.S. Cl.
CPC ............ *G06F 1/1618* (2013.01); *G06F 1/162* (2013.01); *G06F 1/169* (2013.01); *G06F 1/1662* (2013.01); *G06F 1/1679* (2013.01); *G06F 1/1681* (2013.01)

(58) Field of Classification Search
CPC ...... G06F 1/1618; G06F 1/169; G06F 1/1681; G06F 1/1662; G06F 1/162; G06F 1/1679
See application file for complete search history.

(56) References Cited

U.S. PATENT DOCUMENTS

| | | | | |
|---|---|---|---|---|
| 5,200,913 A | * | 4/1993 | Hawkins | G06F 1/1615 345/168 |
| 5,209,448 A | * | 5/1993 | Hatanaka | G06F 1/1616 248/286.1 |
| 5,267,123 A | * | 11/1993 | Boothroyd | G06F 1/1616 16/361 |
| 5,383,138 A | * | 1/1995 | Motoyama | E05C 1/16 361/679.27 |
| 5,489,924 A | | 2/1996 | Shima et al. | |

(Continued)

FOREIGN PATENT DOCUMENTS

WO WO-2013114820 8/2013

*Primary Examiner* — David M Sinclair
*Assistant Examiner* — Theron S Milliser
(74) *Attorney, Agent, or Firm* — HPI Patent Department (57) ABSTRACT

Example implementations relate to a computing device. One example computing device includes a base member having a keyboard. The computing device also includes and a back plate connected to the base member. The back plate includes an upper support member and a lower support member. The computing device further includes a display housing connected to the upper support member. When the computing device is to change from a first operation mode to a second operation mode, the lower support member is to rotate with respect to a first axis of rotation and the display housing is to rotate with respect to a second axis of rotation that is parallel to the first axis of rotation.

21 Claims, 7 Drawing Sheets

(56) References Cited

U.S. PATENT DOCUMENTS

| | | | | |
|---|---|---|---|---|
| 6,005,767 | A * | 12/1999 | Ku | G06F 1/162 |
| | | | | 345/169 |
| 6,430,038 | B1 * | 8/2002 | Helot | G06F 1/1616 |
| | | | | 248/917 |
| 6,464,195 | B1 * | 10/2002 | Hildebrandt | G06F 1/1616 |
| | | | | 248/460 |
| 7,239,505 | B2 | 7/2007 | Keely et al. | |
| 8,526,178 | B2 | 9/2013 | Wu et al. | |
| 8,917,498 | B2 * | 12/2014 | Mai | G06F 1/1683 |
| | | | | 361/679.02 |
| 2001/0055197 | A1 * | 12/2001 | Agata | G06F 1/1616 |
| | | | | 361/679.05 |
| 2004/0114315 | A1 | 6/2004 | Anlauff | |
| 2005/0052833 | A1 * | 3/2005 | Tanaka | G06F 1/162 |
| | | | | 361/679.21 |
| 2005/0052834 | A1 * | 3/2005 | Tanaka | F16M 11/10 |
| | | | | 361/679.27 |
| 2005/0128695 | A1 | 6/2005 | Han | |
| 2006/0077622 | A1 * | 4/2006 | Keely | G06F 1/1616 |
| | | | | 361/679.09 |
| 2007/0058329 | A1 * | 3/2007 | Ledbetter | F16M 11/10 |
| | | | | 361/679.06 |
| 2009/0040701 | A1 * | 2/2009 | Lin | G06F 1/1616 |
| | | | | 361/679.27 |
| 2010/0001163 | A1 * | 1/2010 | Takizawa | F16M 11/105 |
| | | | | 248/371 |
| 2012/0194977 | A1 * | 8/2012 | Liu | G06F 1/162 |
| | | | | 361/679.01 |
| 2013/0242521 | A1 * | 9/2013 | Lin | G06F 1/1624 |
| | | | | 361/807 |
| 2014/0085795 | A1 * | 3/2014 | Xia | G06F 1/1618 |
| | | | | 361/679.09 |
| 2014/0139989 | A1 * | 5/2014 | Mori | G06F 1/1628 |
| | | | | 361/679.09 |
| 2015/0192966 | A1 * | 7/2015 | Kim | G06F 1/1681 |
| | | | | 361/679.28 |
| 2017/0220075 | A1 * | 8/2017 | Park | G06F 1/1656 |

* cited by examiner

COMPUTING DEVICE WITH A ROTATABLE DISPLAY HOUSING

BACKGROUND

Computing devices, such as smartphones or tablet computers, may receive user inputs via different types of input devices. Some mobile devices may receive user input via touchscreens while other mobile devices may receive user input via keyboards.

BRIEF DESCRIPTION OF THE DRAWINGS

Some examples of the present application are described with respect to the following figures.

DETAILED DESCRIPTION

As described above, computing devices such as smartphones or tablet computers, may receive user inputs via different kinds of input devices. Some mobile devices may receive user input via touchscreens while other mobile devices may receive user input via keyboards. Each distinct kind of input device may be more suitable than other kinds of input devices for use under a particular usage scenario. For example, when a user is to draw figures using the computing device, a touchscreen may be more suitable since the use may provide input using gestures. When the user is to input a lot of data, a keyboard may be more suitable. In some cases, a computing device is equipped with a single input device. To have access to different kinds of input devices, a user may use multiple computing devices that are each equipped with a distinct type of input device. Thus, equipment ownership cost is increased.

Examples described herein address the above challenges by a computing device that can operate in multiple operation modes so that different input devices may be used. For example, the computing device may include multiple input devices. A distinct input device may be used in a particular operation mode of the computing device. To change between a first operation mode and a second operation mode, a display housing of the computing device may rotate along a lower support member of a back plate of the computing device. In this manner, examples described herein may reduce an ownership cost associated with a computing device.

Figure 1:
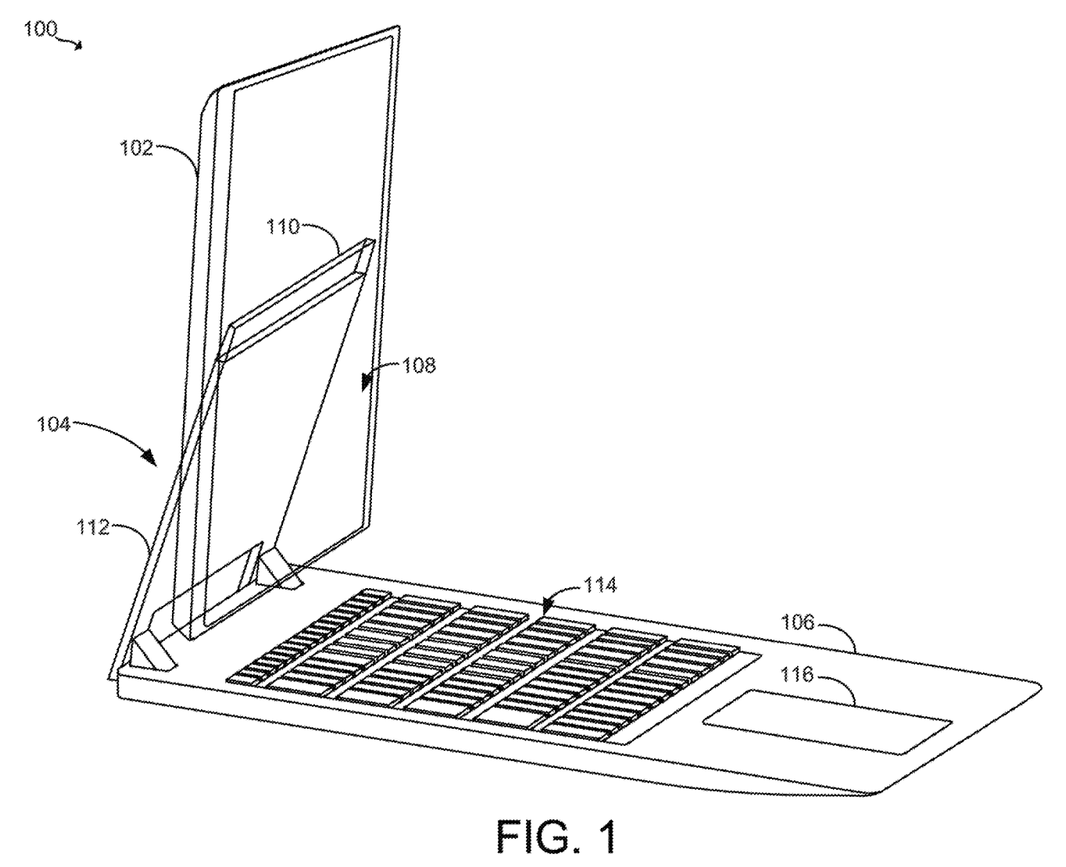
FIG. 1 is a side view of a first operation mode of a computing device with a rotatable display housing, according to an example.

Referring now to the figures, FIG. 1 is a side view of a first operation mode of a computing device 100 with a rotatable display housing, according to an example. Computing device 100 may include a display housing 102, a back plate 104, and a base member 106. Display housing 102 may include a display 108. Display 108 may be any electronic device that is suitable for visual presentation of data and for inputting data into computing device 100. For example, display 108 may be a touchscreen. Display housing 102 may be any structure that is suitable to enclose and protect display 108.

Back plate 104 may include an upper support member 110 and a lower support member 112. Display housing 102 may be connected to upper support member 110. Upper support member 110 may be connected to lower support member 112 via a rotation assembly (not shown in FIG. 1) to enable upper support member 110 and display housing 102 to rotate with respect lower support member 112. Back plate 104 is described in more detail in FIG. 2.

Lower support member 112 may be connected to base member 106 via a rotation assembly (not shown in FIG. 1) so that lower support member 112 may rotate with respect to base member 106. Base member 106 may include a keyboard 114. In some examples, base member 106 may also include a touch pad 116. In some examples, processing components, such as processor, a storage device, etc. may be housed in base member 106. As described in more detail in FIG. 3, computing device 100 may operate in a plurality of operation modes so that different input devices, such as display 108, keyboard 14, and/or touch pad 116 may be accessible to a user to more suitably accommodate different usage scenarios.

Figure 2:
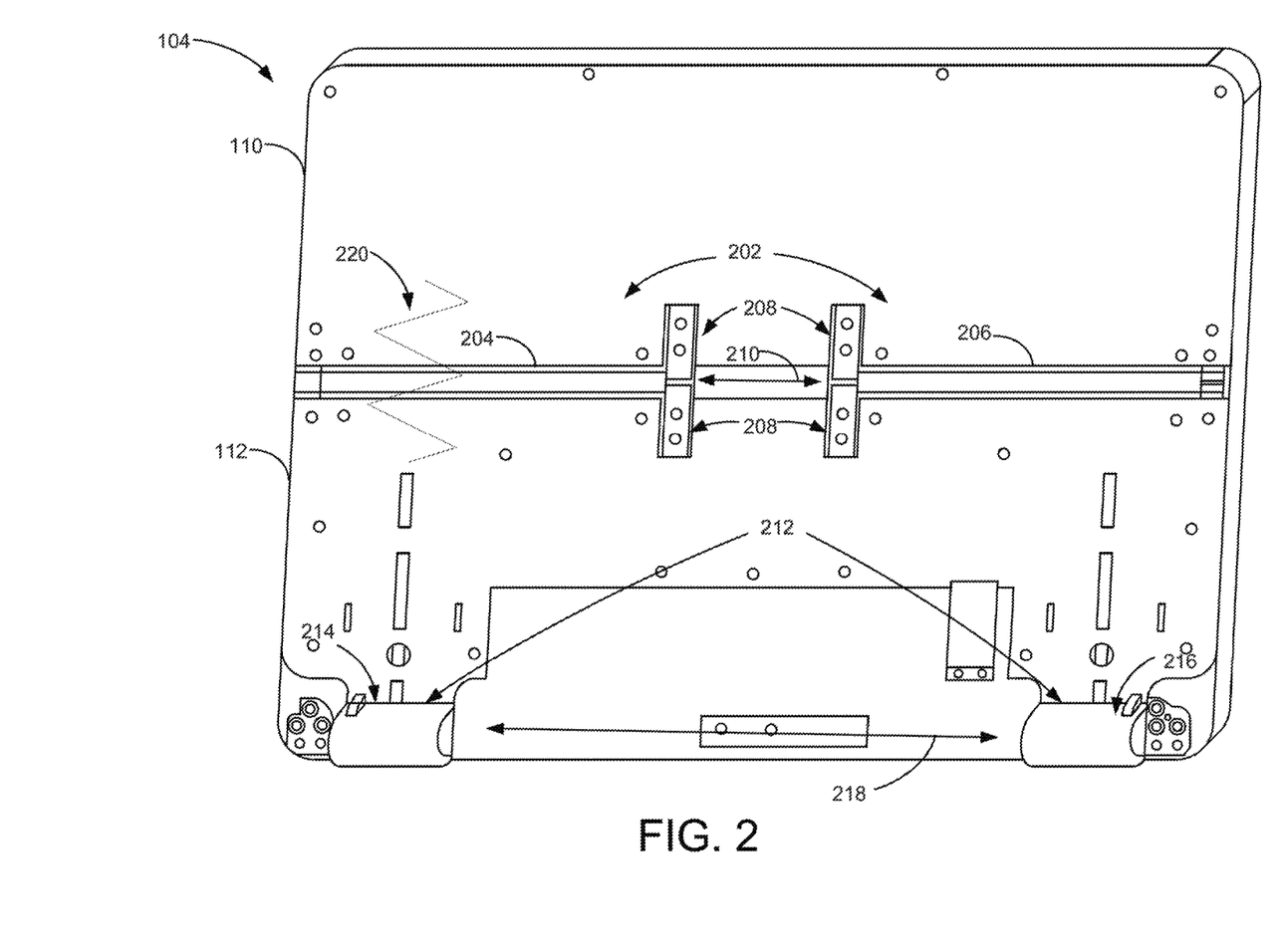
FIG. 2 is a front view of a back plate of the computing device of FIG. 1, according to an example.

FIG. 2 is a front view of back plate 104 of FIG. 1, according to an example. As described in FIG. 1, back plate 104 may include upper support member 110 and lower support member 112. Upper support member 110 may be rotatably connected to lower support member 112 via a first rotation assembly 202. First rotation assembly 202 may be any structure that is suitable to enable upper support member 110 to turn with respect to lower support member 112 or vice versa. For example, first rotation assembly 202 may a hinge assembly that includes hinges 204 and 206. Upper support member 110 and lower support member 112 may be connected to first hinge 204 and to second hinge 206 via connecting plates 208. Thus, upper support member 110 (and display housing 102) may be rotatable along lower support member 112 via a first fixed axis of rotation 210 or vice versa.

Lower support member 112 may be connected to base member 106 (not shown in FIG. 2) via a second rotation assembly 212. Second rotation assembly 212 may be any structure that is suitable to enable lower support member 112 to turn with respect to base member 106. For example, second rotation assembly 212 may a hinge assembly that includes hinges 214 and 216. Second rotation assembly 212 is described in more detail in FIG. 5. Thus, lower support member 112 may be rotatable along base member 106 via a second fixed axis of rotation 218.

In some examples, a spring 220 may be connected to upper support member 110, lower support member 112, or a combination thereof. Spring 220 may enable automatic rotation of upper support member 110 (and display housing 102) with respect to first fixed axis of rotation 210. Spring 220 may be, for example, a compression spring, a torsion spring, etc.

Figure 3A:
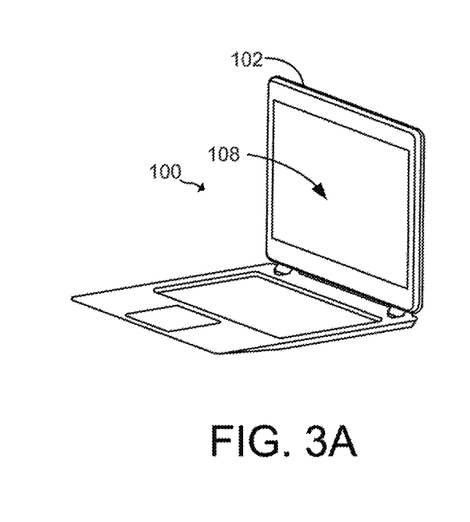
FIGS. 3A-3D illustrate the computing device of FIG. 1 changing between a first operation mode and a second operation mode, according to an example.

FIGS. 3A-3D illustrate computing device 100 of FIG. 1 changing between a first operation mode and a second operation mode, according to an example. In FIG. 3A, computing device 100 may be in a first operation mode. In some examples, the first operation mode may correspond to a laptop operation mode and the second operation mode may correspond to a tablet operation mode. When in the first operation mode, input devices keyboard 114 and/or touch pad 116 may be accessible to a user and display housing 102 may be in a first position such that display 108 may face toward base member 106. As described in more detail in FIG. 3B-3D, to change from the first operation mode to a second operation mode, display housing 102 may be rotated to a second position so that display housing 102 may cover keyboard 114 and/or touch pad 116.

Figure 3B:
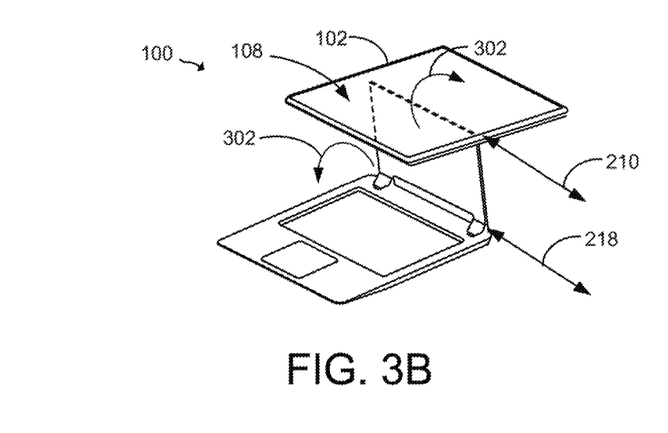
Figure 3C:
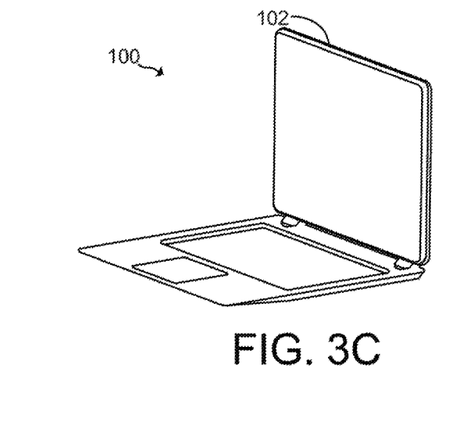

In FIG. 3B, display housing 102 may rotate with respect to first fixed axis of rotation 210 to turn away from base member 106 to an intermediate position (as indicated by a directional arrow 302) via first rotation assembly 202 of FIG. 2 (not shown in FIG. 3B). In some examples, display housing 102 may be rotated by spring 220 of FIG. 2. Lower support member 112 may rotate with respect to second fixed axis of rotation 218 to turn towards base member 106 (as indicated by a directional arrow 304) via second rotation assembly 212 (not shown in FIG. 3B). Second fixed axis of rotation 218 may be parallel to first fixed axis of rotation 210. In some examples, display housing 102 may continue to rotate until display housing 102 rotates 180 degrees relative to the first position, as illustrated in FIG. 3C. Thus, display housing 102 may have a greater degree of rotation than lower support member 112.

Figure 3D:
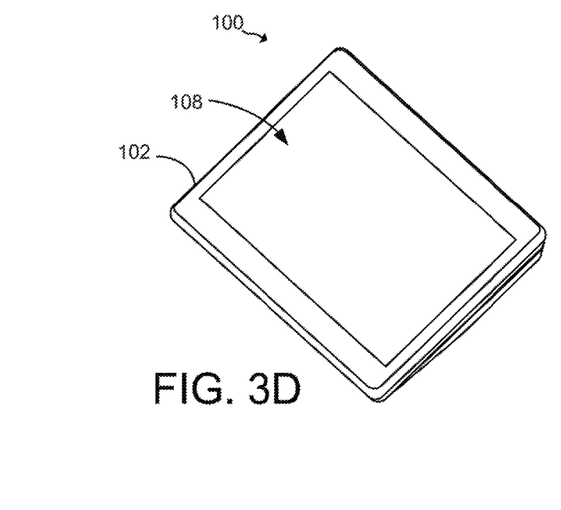

In FIG. 3D, lower support member 112 may continue to rotate until computing device 100 is in the second operation mode. In the second operation mode, display housing 102 and base member 106 may be in a parallel orientation so that keyboard 114 and/or touch pad 116 may be covered by display housing 102. Thus, keyboard 114 and/or touch pad 116 may not be accessible to a user when computing device 100 is in the second operation mode. Accordingly, a user may user display 108 as an input device when computing device 100 is in the second operation mode. To change computing device 100 from the second operation mode back to the first operation mode, lower support member 112 may rotate away from base member 106 and display housing 202 may rotate towards base member 106.

Figure 4:
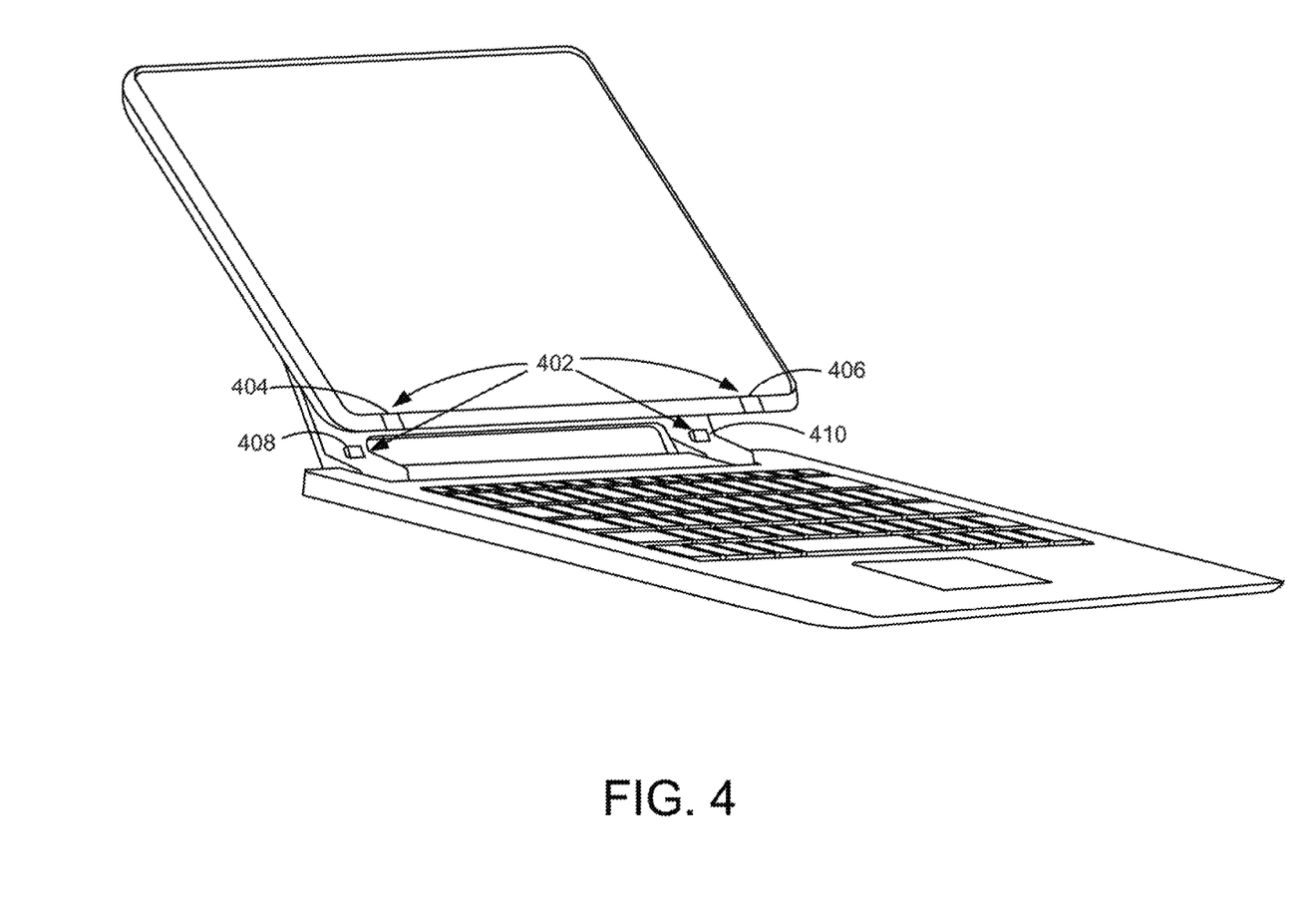
FIG. 4 is a front view of an engagement mechanism of the computing device of FIG. 1 to couple the rotatable display housing to a lower support member of the computing device, according to an example.

FIG. 4 is a front view of an engagement mechanism 402 of computing device 100 of FIG. 1 to couple display housing 102 to lower support member 112, according to an example. When computing device 100 is in the first operation mode (e.g., laptop operation mode), display 108 may be used for visually presenting data to a user. To reduce movement of display housing 102 and to increase stability of display 108 when computing device 100 is in the first operation mode, computing device 100 may include engagement mechanism 402 to couple display housing 102 to lower support member 112. Engagement mechanism 402 may include notches 404-406 and tabs 408-410. Notches 404-406 may be located in display housing 102 and tabs 408-410 may be located in lower support member 112.

When computing device 100 is in the first operation mode, notch 404 may engage tab 408 and notch 406 may engage tab 410 so that display housing 102 may be coupled to lower support member 112. When display housing 102 is coupled to lower support member 112 via engagement mechanism 402, display housing 102 may have a first degree of rotation. Display housing 102 may a second degree of rotation that is greater than the first degree of rotation when display housing 102 is decoupled from lower support member 112, such as when computing device 100 is in the second operation mode or when computing device 100 is transitioning from the first operation mode to the second operation mode. Decoupling of display housing 102 from lower support member 112 is described in more detail in FIG. 6A.

Figure 5:
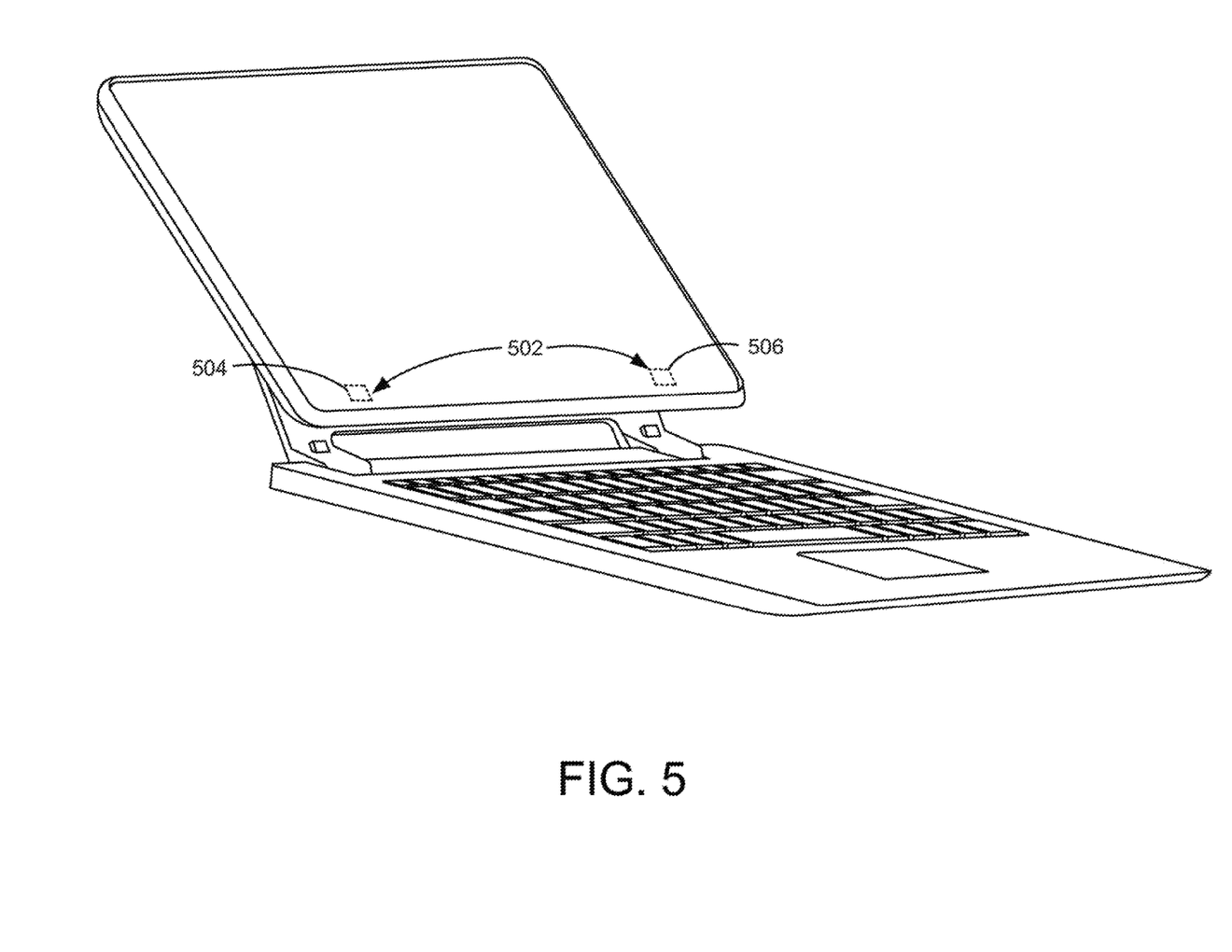
FIG. 5 is a front view of an engagement mechanism of the computing device of FIG. 1 to couple the rotatable display housing to a lower support member of the computing device, according to another example.

FIG. 5 is a front view of an engagement mechanism 502 of computing device 100 of FIG. 1 to couple display housing 102 to lower support member 112, according to another example. Engagement mechanism 502 may include magnets 504-506. In some examples, magnets 504-506 may be located in display housing 102 (as indicated by the dotted lines) and lower support member 112 may be made from metal. In some examples, magnets 504-506 may be located in lower support member 112 and a portion of display housing 102 may be made from metal. Thus, when computing device 100 is in the first operation mode, engagement mechanism 502 may couple display housing 102 to lower support member 112 via magnetic force. Decoupling of display housing 102 from lower support member 112 is described in more detail in FIG. 6A.

Figure 6A:
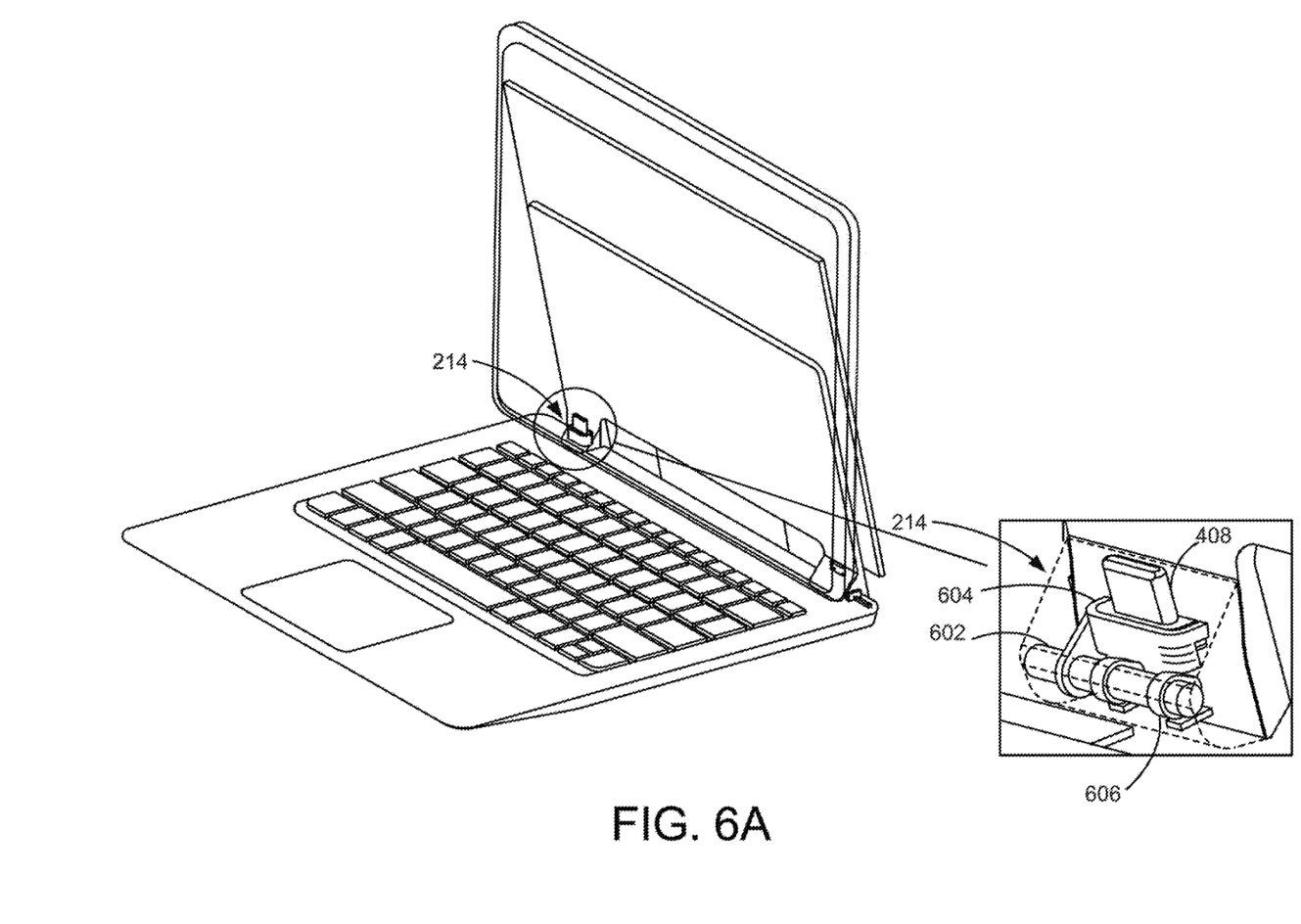
FIG. 6A is a front view of a hinge and a decoupling mechanism of the computing device of FIG. 1 to decouple the rotatable display housing from the lower support member, according to an example.

FIG. 6A is a front view of hinge 214 of computing device 100 and a decoupling mechanism of computing device 100 to decouple the rotatable display housing from the lower support member, according to an example. For purpose of brevity, hinge 214 is shown in FIG. 6A, hinge 216 may be similar to hinge 214. Hinge 214 may include a fixed pin 602 and a rotation bracket 604. In some examples, rotation bracket 604 may be formed integrally with lower support member 112. Tab 408 may be slidably housed in rotation bracket 604. Fixed pin 602 may be connected to rotation bracket 604 via an opening of rotation bracket 604. Fixed pin 602 may be inserted into notches (not shown) of base member 106 so that lower support member 112 may be connected to base member 106. Rotation bracket 604 may be rotated via movement of lower support member 112.

Fixed pin 602 may include a cam 606. Cam 606 may have an oval profile. During operation, cam 606 may control a movement of tab 408 based on a profile of cam 606. The profile of cam 606 is described in more detail in FIG. 6B. In an example, when engagement mechanism 402 of FIG. 4 is used to couple display housing 102 to lower support member 112, cam 606 may control an engagement and a disengagement of tab 408 with notch 404. Cam 606 may have a first cam profile such that the first cam profile may keep tab 408 at an upward position extending from lower support member 112. Tab 408 at the upward position may engage notch 404. However, when lower support member 112 is at a particular orientation, the first cam profile may not keep tab 408 at the upward position and tab 408 may slide into lower support member 112 to disengage from notch 404. Thus, to disengage tab 408 from notch 404, lower support member 112 may be rotated to the particular orientation. For example, lower support member 112 may be rotated towards base member 106 to disengage tab 408 from notch 404. When tab 408 is disengaged from notch 404, display housing 102 may be rotated automatically, for example via spring 220, so that computing device 100 may transition from the first operation mode to the second operation mode.

In another example, when engagement mechanism 502 of FIG. 5 is used to couple display housing 102 to lower support member 112, cam 606 may control coupling and decoupling of display housing 102 and lower support member 112. Cam 606 may have a second cam profile such that the second cam profile may keep tab 408 from protruding out of lower support member 112 until lower support member 112 is at a particular orientation. When lower support member 112 is at the particular orientation, the second cam profile may cause tab 408 to protrude out of lower support member 112 to wedge between lower support member 112 and display housing 102. Thus, the protrusion of tab 408 may decouple display housing 102 from lower support member 112 by disrupting the magnetic force used to couple display housing 102 to lower support member 112. Subsequently, display housing 102 may be rotated automatically, for example via spring 220, so that computing device 100 may transition from the first operation mode to the second operation mode.

Figure 6B:
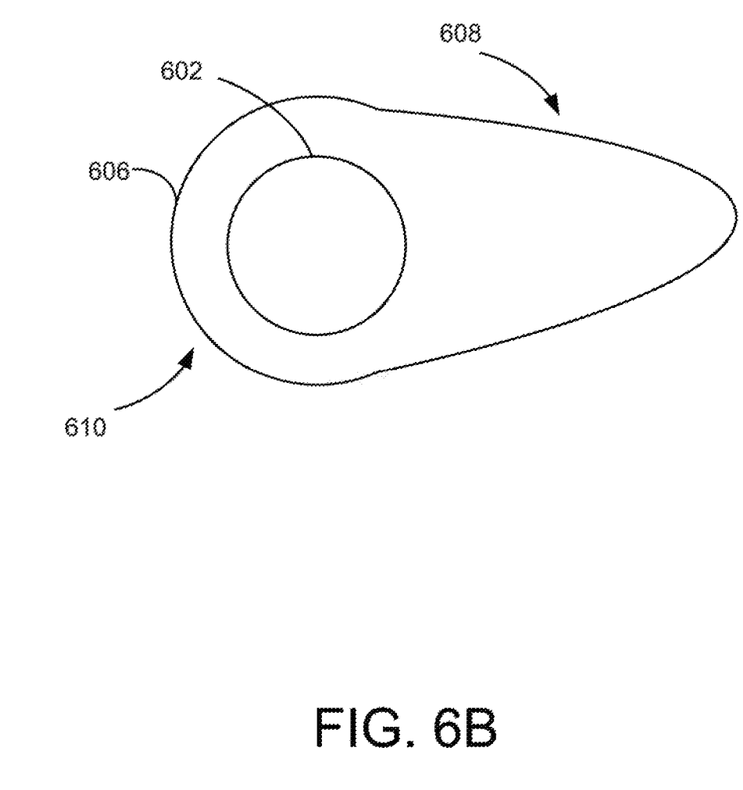
FIG. 6B is a profile of a fixed pin with a cam of the computing device of FIG. 1, according to an example.

FIG. 6B is a profile of fixed pin 602 with cam 606 of computing device 100 of FIG. 1, according to an example. As illustrated in FIG. 6B, cam 606 may extend from fixed pin 602. Cam 606 may include an elongated region 608 and a circular region 610. Based on an orientation or a placement of elongated region 608 and circular region 610 relative to fixed pin 602, cam 606 may have different profiles. Elongated region 608 may cause tab 408 of FIG. 4 to protrude out of lower support member 112 or to slide into lower support member 112.

According to the foregoing, example embodiments disclosed herein enable a computing device to change between a first operation mode and a second operation mode by rotating a display housing of the computing device and a lower support member of the computing device. The first operation mode may enable a first kind of input device to be accessible to a user and the second operation mode may enable a second kind of input device to be accessible to the user. Thus, different kinds of input devices may be accessible to more suitably accommodate different usage scenarios.

The use of "comprising", "including" or "having" are synonymous and variations thereof herein are meant to be inclusive or open-ended and do not exclude additional unrecited elements or method steps.

What is claimed is:

1. A computing device comprising:
   a base member including a keyboard;
   a back plate connected to the base member, the back plate including a spring, an upper support member, and a lower support member, the lower support member comprising a first engagement member; and
   a display housing connected to the upper support member, wherein, when the computing device is to change from a laptop operation mode to a tablet operation mode, the lower support member is to rotate with respect to a first axis of rotation, and the display housing is to rotate with respect to a second axis of rotation parallel to the first axis of rotation, the display housing comprising a second engagement member that when engaged with the first engagement member couples the display housing to the lower support member,
   wherein the spring is connected to the upper support member and applies a force on the upper support member that automatically rotates the display housing with respect to the second axis from a position of the laptop operation mode toward a position of the tablet operation mode when the second engagement member is disengaged from the first engagement member to decouple the display housing from the lower support member.

2. The computing device of claim 1, wherein the display housing has a first degree of rotation when the computing device is in the laptop operation mode, and wherein the display housing has a second degree of rotation that is greater than the first degree of rotation when the computing device is in the tablet operation mode.

3. The computing device of claim 1, wherein the display housing and the base member are in a parallel orientation when the computing device is in the tablet operation mode.

4. The computing device of claim 1, wherein the first axis of rotation and the second axis of rotation are fixed axes of rotation.

5. The computing device of claim 1, wherein the first engagement member is a tab, and the second engagement member is a notch.

6. The computing device of claim 1, wherein the first and second engagement members when engaged prevents the force of the spring from rotating the upper support member, and wherein the first and second engagement members when disengaged allows the force of the spring to rotate the upper support member with respect to the second axis.

7. The computing device of claim 6, further comprising a first rotation assembly that includes a fixed pin, wherein the fixed pin includes a cam having an elongated profile, wherein the cam is rotatable with rotation of the lower support member, the cam in a first rotational position to maintain the first and second engagement members engaged, and the cam in a second rotational position to cause disengagement of the first and second engagement members.

8. The computing device of claim 1, wherein the first and second engagement members when engaged maintains the computing device in the laptop operation mode, and the second engagement member when disengaged from the first engagement member allows a transition of the computing device from the laptop operation mode toward the tablet operation mode by operation of the spring.

9. The computing device of claim 1, wherein the spring applies the force on the upper support member that automatically rotates the display housing with respect to the second axis from the position of the laptop operation mode to an intermediate position between the position of the laptop operation mode and the position of the tablet operation mode.

10. A computing device comprising:
    a base member including a keyboard;
    a back plate connected to the base member, the back plate including a spring, an upper support member, and a lower support member rotatably connected to the upper support member, the lower support member comprising a first engagement member; and
    a display housing connected to the upper support member, the display housing including a second engagement member, wherein, when the computing device is to change from a laptop operation mode to a tablet operation mode, the lower support member is to rotate with respect to a first axis of rotation, and the display housing is to rotate with respect to a second axis of rotation that is parallel to the first axis of rotation, wherein in the laptop operation mode the first and second engagement members are engaged, and in the tablet operation mode the first and second engagement members are disengaged, and wherein the spring is connected to the upper support member and applies a force on the upper support member that automatically rotates the display housing with respect to the second axis from a position of the laptop operation mode while the force is applied on the upper support member by the spring toward a position of the tablet operation mode while the force is applied on the upper support member by the spring when the second engagement member is disengaged from the first engagement member to decouple the display housing from the lower support member.

11. The computing device of claim 10, further comprising a first rotation assembly that includes a fixed pin, wherein the fixed pin includes a cam having an elongated profile, and wherein rotation of the cam when the computing device is to change from the laptop operation mode to the tablet operation mode causes disengagement of the first and second engagement members.

12. The computing device of claim 10, wherein the first axis of rotation and the second axis of rotation are fixed axes of rotation.

13. The computing device of claim 10, wherein the display housing has a first degree of rotation when the computing device is in the laptop operation mode, and wherein the display housing has a second degree of rotation greater than the first degree of rotation when the computing device is in the tablet operation mode.

14. The computing device of claim 10, wherein the first and second engagement members when engaged prevents the force of the spring from rotating the upper support member, and wherein the first and second engagement members when disengaged allows the force of the spring to rotate the upper support member with respect to the second axis.

15. The computing device of claim 10, wherein the first and second engagement members when engaged maintains the computing device in the laptop operation mode, and the second engagement member when disengaged from the first engagement member allows a transition of the computing device from the laptop operation mode toward the tablet operation mode by operation of the spring.

16. A computing device comprising:
a base member including a keyboard;
a back plate including a spring, an upper support member, and a lower support member, the lower support member comprising a first engagement member;
a first rotation assembly to connect the base member to the lower support member;
a second rotation assembly to connect the upper support member to the lower support member; and
a rotatable display housing connected to the upper support member,
wherein, when the computing device is to change from a laptop operation mode to a tablet operation mode, the lower support member is to rotate with respect to a first axis of rotation, and the rotatable display housing is to rotate with respect to a second axis of rotation that is parallel to the first axis of rotation, the display housing comprising a second engagement member that when engaged with the first engagement member couples the display housing to the lower support member, and
wherein the spring is connected to the upper support member and applies a force on the upper support member that automatically rotates the display housing with respect to the second axis from a position of the laptop operation mode while the force is applied on the upper support member by the spring toward a position of the tablet operation mode while the force is applied on the upper support member by the spring when the second engagement member is disengaged from the first engagement member to decouple the display housing from the lower support member.

17. The computing device of claim 16, wherein the rotatable display housing has a first degree of rotation when the computing device is in the laptop operation mode, and wherein the rotatable display housing has a second degree of rotation that is greater than the first degree of rotation when the computing device is in the tablet operation mode.

18. The computing device of claim 16, wherein the first axis of rotation and the second axis of rotation are fixed axes of rotation.

19. The computing device of claim 16, wherein the first and second engagement members when engaged prevents the force of the spring from rotating the upper support member, and wherein the first and second engagement members when disengaged allows the force of the spring to rotate the upper support member with respect to the second axis.

20. The computing device of claim 19, wherein the first rotation assembly includes a fixed pin, and wherein the fixed pin includes a cam having an elongated profile, wherein the cam is to rotate with rotation of the lower support member, the cam in a first rotational position to maintain the first and second engagement members engaged, and the cam in a second rotational position to cause disengagement of the first and second engagement members.

21. The computing device of claim 16, wherein the first and second engagement members when engaged maintains the computing device in the laptop operation mode in which the keyboard is accessible for use, and the second engagement member when disengaged from the first engagement member allows a transition of the computing device from the laptop operation mode toward the tablet operation mode by operation of the spring.

* * * * *